US009771005B2

(12) United States Patent
Mo

(10) Patent No.: US 9,771,005 B2
(45) Date of Patent: Sep. 26, 2017

(54) RAISING MECHANISM AND CHILD SAFETY SEAT THEREWITH

(71) Applicant: Xiao-Long Mo, Guangdong (CN)

(72) Inventor: Xiao-Long Mo, Guangdong (CN)

(73) Assignee: BP Children's Products HK Co., Limited, Wanchai (HK)

( * ) Notice: Subject to any disclaimer, the term of this patent is extended or adjusted under 35 U.S.C. 154(b) by 147 days.

(21) Appl. No.: 14/931,854

(22) Filed: Nov. 4, 2015

(65) Prior Publication Data

US 2016/0144749 A1 May 26, 2016

(30) Foreign Application Priority Data

Nov. 20, 2014 (CN) .......................... 2014 1 0669296

(51) Int. Cl.
*B60N 2/28* (2006.01)
*B60N 2/22* (2006.01)
*B60N 2/42* (2006.01)

(52) U.S. Cl.
CPC ............. *B60N 2/22* (2013.01); *B60N 2/2851* (2013.01); *B60N 2/2875* (2013.01); *B60N 2/2878* (2013.01); *B60N 2/42* (2013.01); *B60N 2002/2204* (2013.01)

(58) Field of Classification Search
CPC ............................ B60N 2/2875; B60N 2/2878
USPC ................................................... 297/256.11
See application file for complete search history.

(56) References Cited

U.S. PATENT DOCUMENTS

| 4,205,877 A * | 6/1980 | Ettridge ............... | B60N 2/2821 |
| | | | 297/256.13 |
| 6,045,184 A * | 4/2000 | Nakagawa ........... | B60N 2/2821 |
| | | | 297/250.1 |
| 6,773,065 B1 * | 8/2004 | Stamper ................. | A47D 5/006 |
| | | | 297/250.1 |
| 8,282,165 B2 * | 10/2012 | Kespohl ............... | B60N 2/2845 |
| | | | 297/184.13 |
| 2007/0057546 A1 * | 3/2007 | Chen .................... | B60N 2/2875 |
| | | | 297/256.13 |
| 2007/0057547 A1 * | 3/2007 | Hartenstine .......... | B60N 2/2806 |
| | | | 297/256.13 |
| 2009/0001791 A1 * | 1/2009 | Hutchinson .......... | B60N 2/2821 |
| | | | 297/250.1 |

(Continued)

FOREIGN PATENT DOCUMENTS

| CN | 201604541 U | 10/2010 |
| DE | 695 01 881 T2 | 12/1998 |

(Continued)

*Primary Examiner* — Timothy J Brindley
(74) *Attorney, Agent, or Firm* — Winston Hsu

(57) ABSTRACT

A raising mechanism is adapted for a child safety seat. The child safety seat includes a base and a backrest disposed on the base. The raising mechanism includes a front raising block, a rear raising block, and a driving member. A front end of the front raising block is connected to the base. A rear raising block is connected to the front raising block. The front raising block and the rear raising block form a seating portion cooperatively. The driving member is movably disposed on the base or the backrest. The driving member drives the front raising block and the rear raising block to raise the seating portion. Therefore, the raising mechanism improves sitting comfort and safety and has advantages of simple structure, low manufacturing cost, and easy operation.

18 Claims, 7 Drawing Sheets

(56) References Cited

U.S. PATENT DOCUMENTS

| | | | |
|---|---|---|---|
| 2009/0322131 A1* | 12/2009 | Hartenstine | B60N 2/2821 |
| | | | 297/256.11 |
| 2013/0193723 A1* | 8/2013 | Wuerstl | A47D 13/02 |
| | | | 297/183.3 |
| 2013/0320725 A1 | 12/2013 | Conway | |
| 2014/0232152 A1* | 8/2014 | Minato | B60N 2/2809 |
| | | | 297/216.11 |
| 2016/0059747 A1* | 3/2016 | Pos | B60N 2/2812 |
| | | | 297/183.6 |
| 2017/0129370 A1* | 5/2017 | Chen | B60N 2/2878 |

FOREIGN PATENT DOCUMENTS

| | | |
|---|---|---|
| DE | 10 2007 043 020 A1 | 3/2009 |
| EP | 0 931 691 A1 | 7/1999 |
| EP | 2 006 150 A2 | 12/2008 |
| EP | 1 813 469 B1 | 10/2011 |

* cited by examiner

RAISING MECHANISM AND CHILD SAFETY SEAT THEREWITH

BACKGROUND OF THE INVENTION

1. Field of the Invention

The present invention relates to a carrier, and more particularly, to a raising mechanism and a child safety seat therewith.

2. Description of the Prior Art

With development of the society, the economy, and the technology, there are more and more consumer products which facilitate people's daily life, such as child safety seats. Since child safety seats are not only comfortable to sit but also ensure children's safety, the child safety seats become more and more popular.

In the current market, there is a conventional child safety seat which is integrated and not capable of being adjusted. Since a height and a size of the integrated conventional child safety seat are not adjustable, the integrated conventional child safety seat is not suitable for children with different heights, which affects sitting comfort and safety.

There is another conventional child safety seat including an adjusting mechanism and capable of being adjusted according to a height of a child. However, the adjusting mechanism has disadvantages of complicated and unreliable structure, difficult operation, and high manufacturing cost.

Furthermore, when a younger or shorter child sits on a conventional child safety seat, it is easy to harm the younger child's skeleton, especially spine. Therefore, in many countries, when a child at 0 to 6 months of age sits on a child safety seat, it is required to raise his/her back above his/her hip. However, most of the conventional child safety seat cannot satisfy the aforementioned requirement and fails to ensure the child's safety.

Therefore, there is a need to design a raising mechanism and a child safety seat therewith to overcome the problems.

SUMMARY OF THE INVENTION

In order to solve the above-mentioned drawbacks, the present invention aims at providing a raising mechanism and a child safety seat therewith which are capable of raising a child to a desired position according to a height of the child.

According to the claimed invention, a raising mechanism adapted for a child safety seat is disclosed. The child safety seat includes a base and a backrest disposed on the base. The raising mechanism includes a front raising block, a rear raising block, and a driving member. A front end of the front raising block is connected to the base. A rear raising block is connected to the front raising block. The front raising block and the rear raising block form a seating portion cooperatively. The driving member is movably disposed on the base or the backrest. The driving member drives the front raising block and the rear raising block to raise the seating portion.

Preferably, the child safety seat further includes a headrest slidably disposed on the backrest along a vertical direction of the backrest. The driving member is slidably disposed on the backrest along the vertical direction of the backrest, and the headrest engages the driving member to drive the front raising block and the rear raising block to raise the seating portion.

Preferably, when the headrest is adjusted to be located at a lowest position, the headrest pushes the driving member to drive the front raising block and the rear raising block to raise the seating portion to a highest position.

Preferably, the raising mechanism further includes at least two engaging portions disposed on the backrest along the vertical direction of the backrest, and the headrest selectively engages with one of the at least two engaging portions.

Preferably, the raising mechanism further includes a pushing portion disposed on a lower end of the headrest and a pushed portion disposed on an end of the driving member near the headrest, and the pushing portion abuts against the pushed portion.

Preferably, a restraining and guiding slot is formed on the driving member along a longitudinal direction, the raising mechanism further comprises a restraining and guiding rod disposed on the backrest and passing through the restraining and guiding slot.

Preferably, the raising mechanism further includes a first resilient member connected between the driving member and the backrest. The first resilient member biases the driving member to slide toward the headrest.

Preferably, the raising mechanism further includes a first pivoting shaft. The front end of the front raising block is pivoted to the base by the first pivoting shaft.

Preferably, the first pivoting shaft is disposed along a horizontal direction of the base.

Preferably, the raising mechanism further includes a second pivoting shaft. A rear end of the front raising block is pivoted to a front end of the rear raising block by the second pivoting shaft.

Preferably, the second pivoting shaft is disposed along a horizontal direction of the base.

Preferably, the raising mechanism further includes a linking member. An end of the linking member is pivoted to the second pivoting shaft. The other end of the linking member is pivoted to the driving member. The driving member is disposed on the backrest along a vertical direction of the backrest, and the driving member raises the front raising block and the rear raising block by the linking member.

Preferably, the raising mechanism further includes a second resilient member connected between the linking member and the driving member. The second resilient member biases the linking member to drive the second pivoting shaft to move toward the base.

According to the claimed invention, a child safety seat includes a base, a backrest, and a raising mechanism. The backrest is disposed on the base. The raising mechanism includes a front raising block, a rear raising block, and two driving members. A front end of the front raising block is connected to the base. The rear raising block is connected to the front raising block. The front raising block and the rear raising block form a seating portion cooperatively. The two driving members are movably disposed on the base or the backrest. The two driving members drive the front raising block and the rear raising block to raise the seating portion.

Preferably, the child safety seat further includes a pair of guiding tracks. The pair of guiding tracks is disposed on the backrest along a vertical direction of the backrest. A rear end of the rear raising block is located between the pair of guiding tracks.

Preferably, the two driving members are slidably disposed in the pair of guiding tracks respectively.

In summary, the raising mechanism of the present invention utilizes the driving member for raising the front raising block and the rear raising block, so as to raise a child sitting on the seating portion to a desired position according to a height of the child, which improves sitting comfort and safety. Furthermore, the raising mechanism and the child safety seat of the present invention have advantages of simple structure, low manufacturing cost, and easy operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
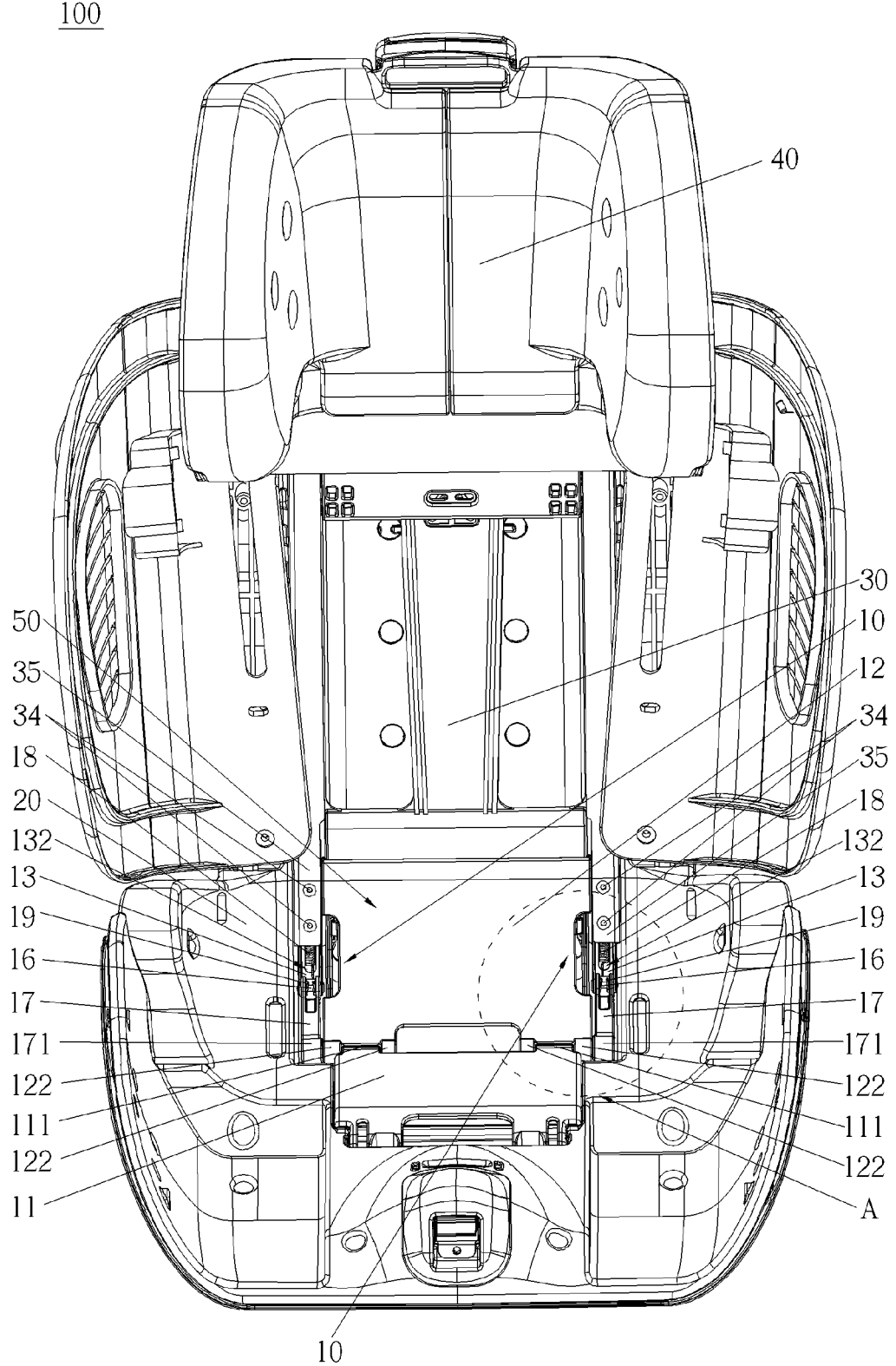
FIG. 1 is a front view of a child safety seat according to an embodiment of the present invention.
Figure 2:
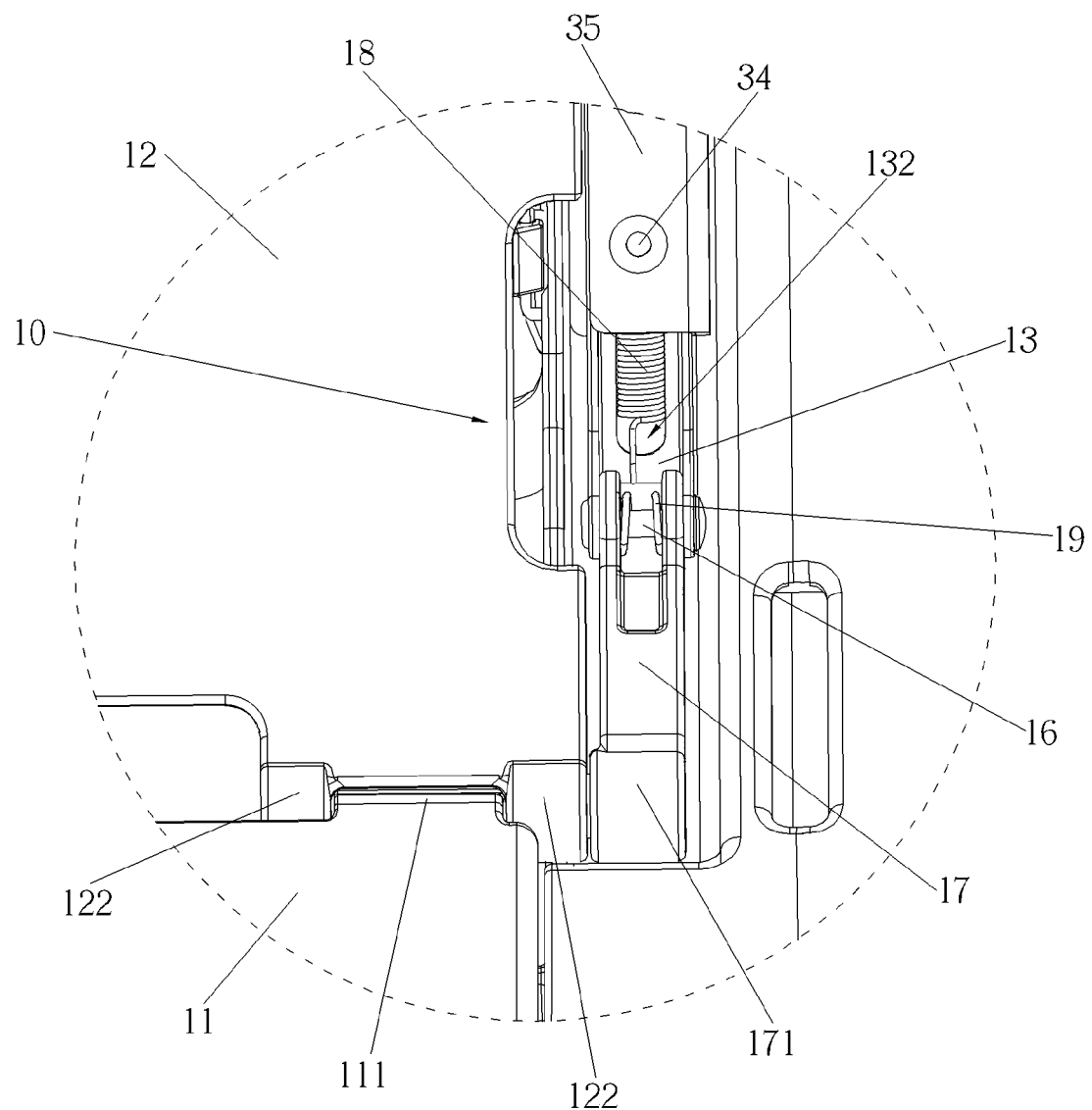
FIG. 2 is an enlarged diagram of an A portion of the child safety seat shown in FIG. 1 according to the embodiment of the present invention.
Figure 3:
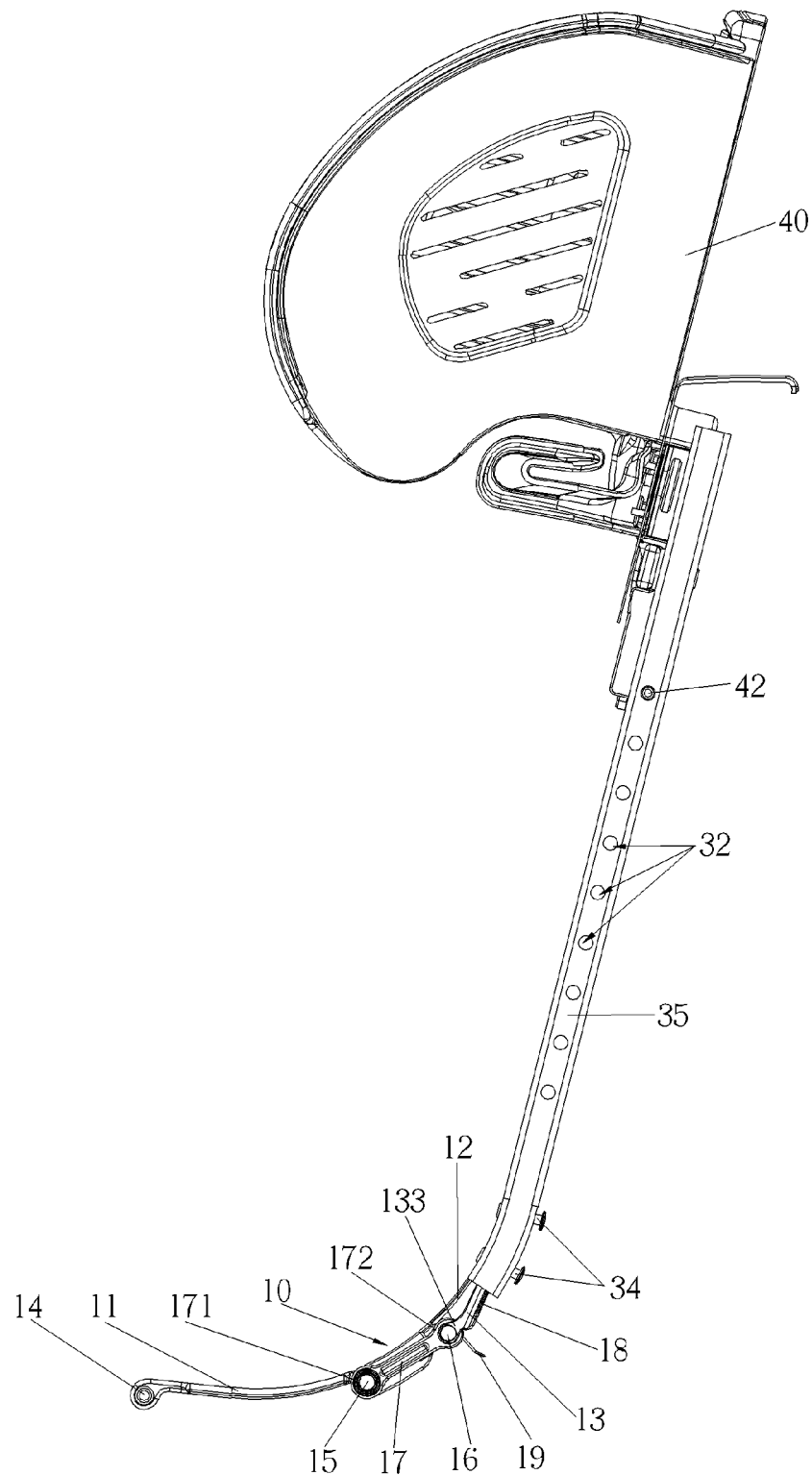
FIG. 3 is a lateral view of the child safety seat without illustrating a backrest and a base as a front raising block and a rear raising block are located at lowest positions according to the embodiment of the present invention.
Figure 4:
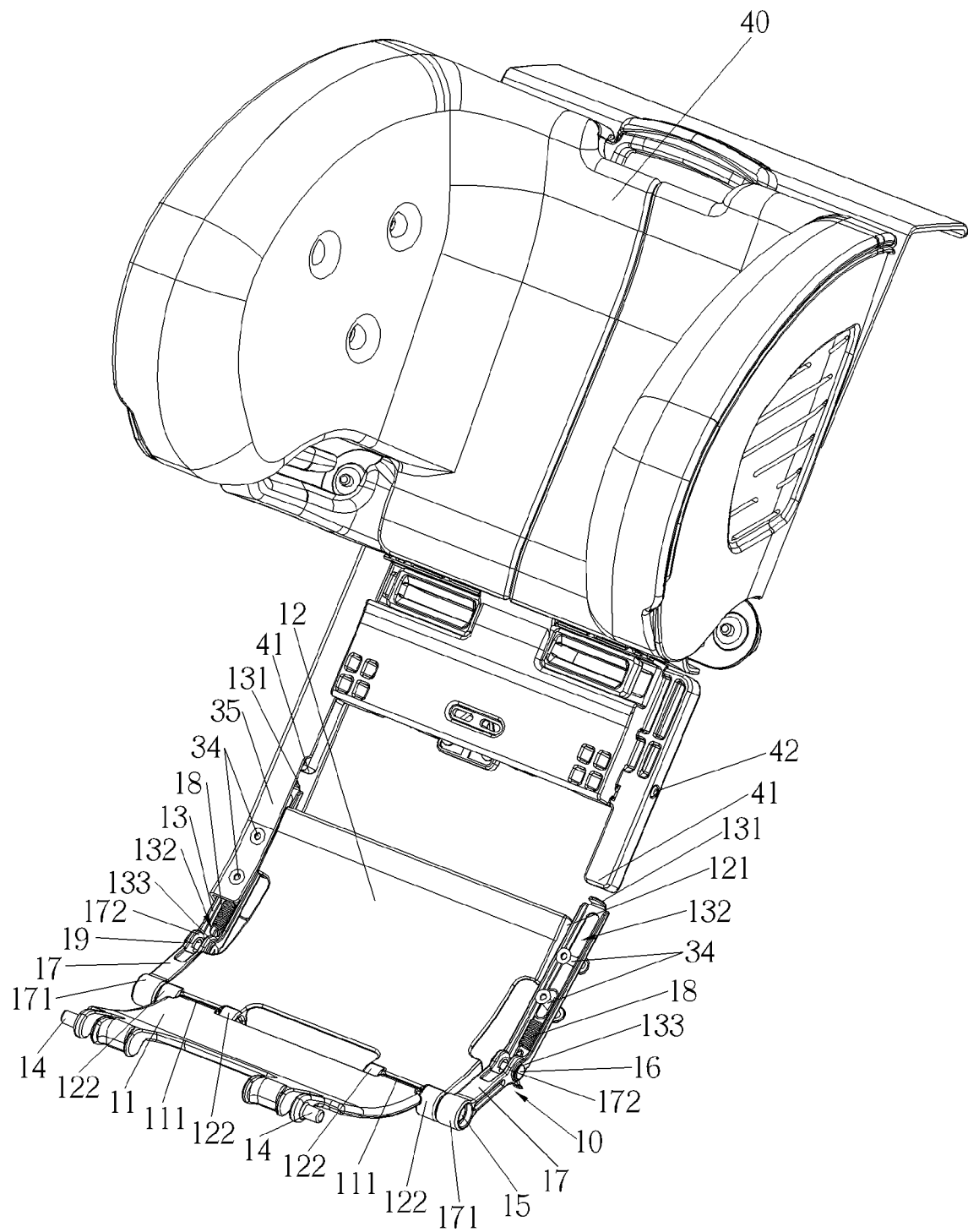
FIG. 4 is a schematic diagram of the child safety seat shown in FIG. 3 according to the embodiment of the present invention.
Figure 5:
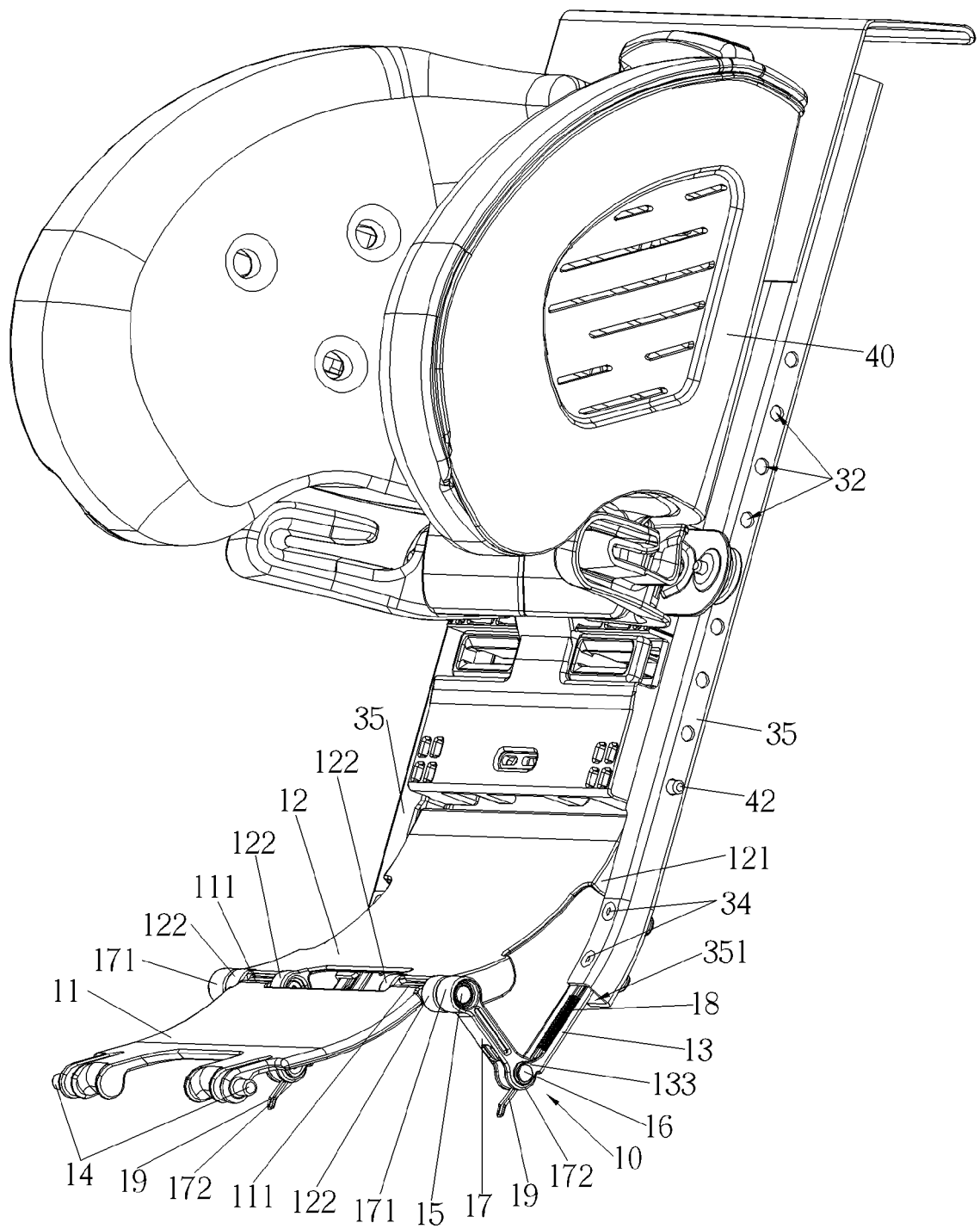
FIG. 5 is a schematic diagram of the child safety seat without illustrating the backrest and the base as the front raising block and the rear raising block are located at highest positions according to the embodiment of the present invention.
Figure 6:
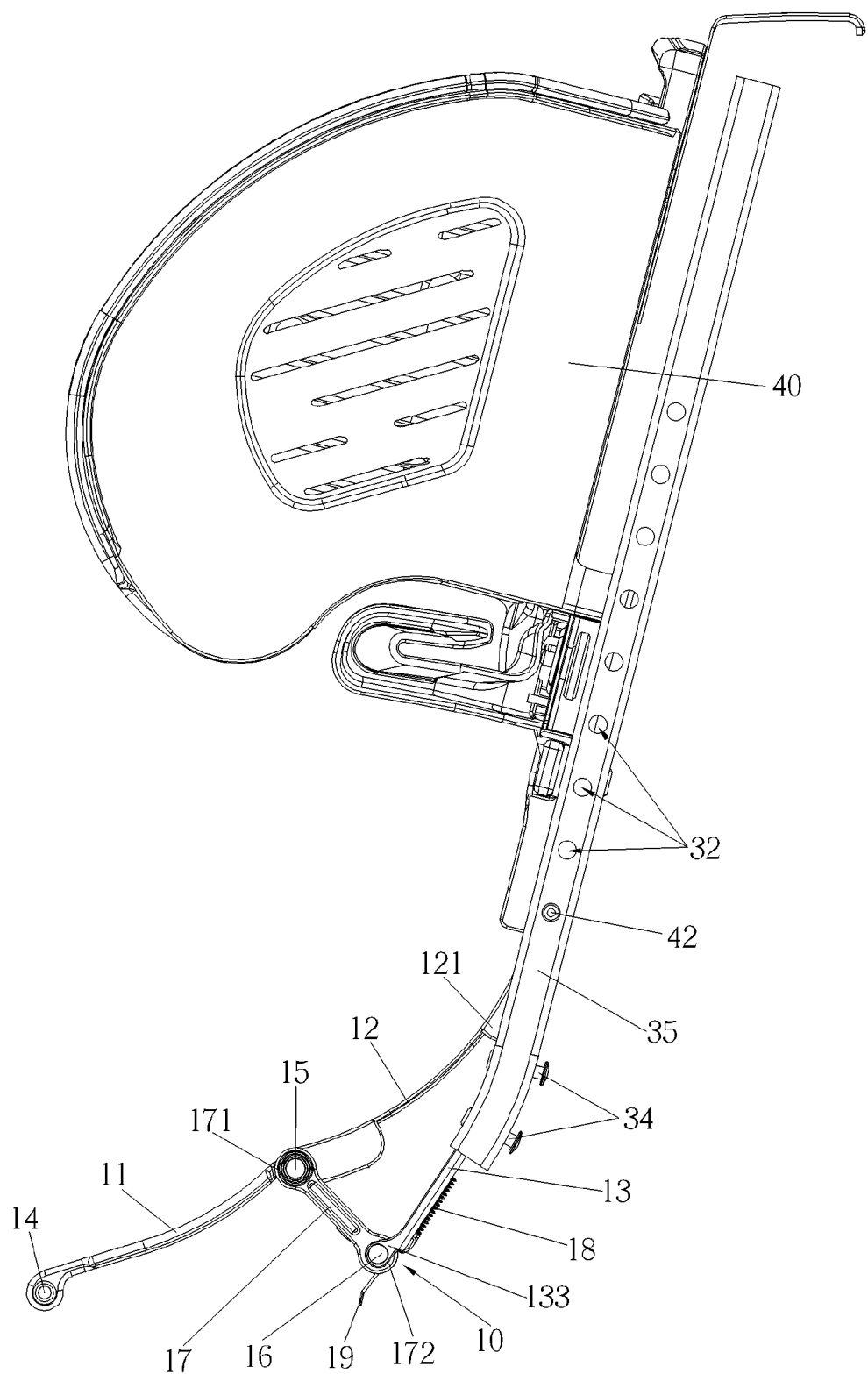
FIG. 6 is a lateral view of the child safety seat shown in FIG. 5 according to the embodiment of the present invention.
Figure 7:
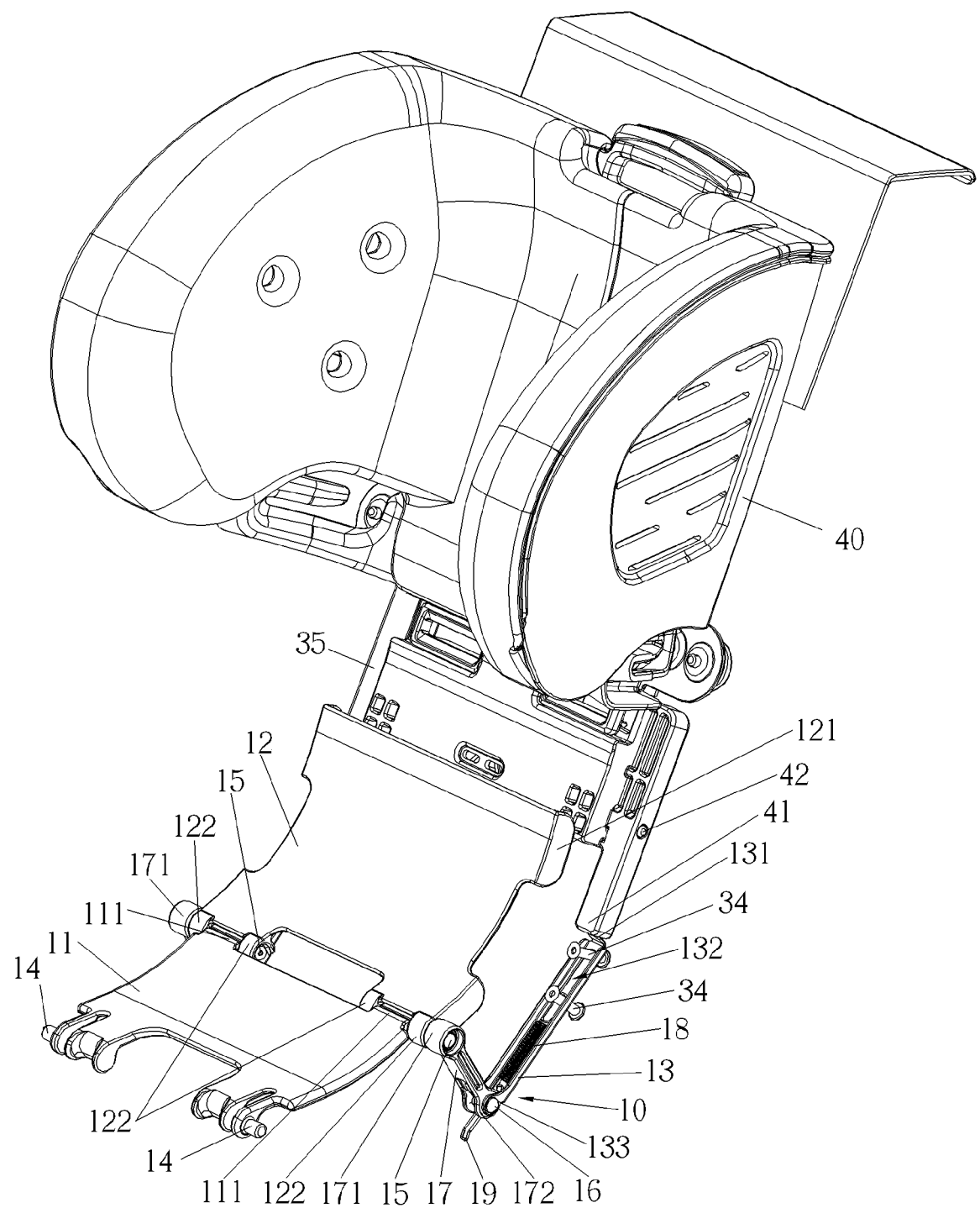
FIG. 7 is a schematic diagram of the child safety seat shown in FIG. 5 without illustrating the backrest, the base and one guiding track according to the embodiment of the present invention.

Please refer to FIG. 1 to FIG. 7. FIG. 1 is a front view of a child safety seat 100 according to an embodiment of the present invention. FIG. 2 is an enlarged diagram of an A portion of the child safety seat 100 shown in FIG. 1 according to the embodiment of the present invention. FIG. 3 is a lateral view of the child safety seat 100 without illustrating a backrest 30 and abase 20 as a front raising block 11 and a rear raising block 12 are located at lowest positions according to the embodiment of the present invention. FIG. 4 is a schematic diagram of the child safety seat 100 shown in FIG. 3 according to the embodiment of the present invention. FIG. 5 is a schematic diagram of the child safety seat 100 without illustrating the backrest 30 and the base 20 as the front raising block 11 and the rear raising block 12 are located at highest positions according to the embodiment of the present invention. FIG. 6 is a lateral view of the child safety seat 100 shown in FIG. 5 according to the embodiment of the present invention. FIG. 7 is a schematic diagram of the child safety seat 100 shown in FIG. 5 without illustrating the backrest 30, the base 20 and one guiding track 35 according to the embodiment of the present invention.

The child safety seat 100 includes the base 20, a raising mechanism 10, the backrest 30, and a headrest 40, a pair of guiding tracks 35. The backrest 30 is disposed on the base 20. Preferably, the backrest 30 is disposed on the base 20 along a vertical direction. The headrest 40 is slidably disposed on the backrest 30 along a vertical direction of the backrest 30. The pair of guiding tracks 35 are disposed on the backrest 30 along the vertical direction of the backrest 30, i.e., the pair of guiding tracks 35 are parallel to each other. At least two engaging portions 32 are formed on each of the pair of guiding tracks 35, and two engaging members 42 are disposed on the headrest 40 and corresponding to the two rows of engaging portions 32. The two engaging members 42 selectively engage with the two corresponding engaging portions 32 for adjusting a position of the headrest 40 relative to the backrest 30, which makes structure more reasonable and compact.

The raising mechanism 10 includes two driving members 13, the front raising block 11, and the rear raising block 12. The front raising block 11 and the rear raising block 12 are connected to each other to form a seating portion 50 cooperatively for a child to sit. A front end of the front raising block 11 is connected to the base 20. The front raising block 11 is pivoted to the rear raising block 12. A rear end of the rear raising block 12 is connected to the backrest 30. The two driving members 13 are movably disposed on the base 20 or the backrest 30. In this embodiment, the two driving members 13 are preferably slidably disposed in the pair of guiding tracks 35. Preferably, two receiving slots 351 are formed on the pair of guiding tracks 35 for slidably receiving the two driving members 13, which makes structure more reasonable, compact, and reliable. The headrest 40 engages the two driving members 13 to drive the front raising block 11 and the rear raising block 12 to raise the seating portion 50. That is, the two driving members 13 raise the front raising block 11 and the rear raising block 12 along a direction away from the base 20, so as to raise a child who sits on the seating portion 50 to a desired position according to a height of the child, which improves comfort and safety of the children.

Furthermore, two pushing portions 41 are disposed on a lower end of the headrest 40. Two pushed portions 131 are disposed on ends of the two driving members 13 near the headrest 40. When the headrest 40 is adjusted to a lowest position relative to the backrest 30, the pushing portions 41 on the lower end of the headrest 40 push the two pushed portions 131 on the two driving members 13 to drive the front raising block 11 and the rear raising block 12 to raise the seating portion 50 to a highest position relative to the base 20. That is, when the headrest 40 is adjusted according to a height of a child, the two pushing portions 41 abut against and push the two pushed portions 131, such that the two driving members 13 are driven to raise the front raising block 11 and the rear raising block 12 for raising the child's back simultaneously, which provides a better protection for the child's skeleton.

More specifically, two restraining and guiding slots 132 are formed on the two driving members 13 along longitudinal directions of the two driving members 13. Two restraining and guiding rods 34 are fixedly connected to a wall of each of the two receiving slots 351 and slidably passing through the corresponding restraining and guiding slots 132. The four restraining and guiding rods 34 slidably cooperate with the two restraining and guiding slots 132, so as to make sliding movements of the two driving members 13 smoother and more reliable and to make structure more reasonable and compact. Furthermore, it also prevents the two driving members 13 from disengaging from the pair of guiding tracks 35. Besides, in this embodiment, both of the two pushing portions 41 and the two pushed portions 131 are received in the two receiving slots 351 of the pair of guiding tracks 35, which reduces an occupied space and makes structure more reasonable, compact and reliable.

Furthermore, the raising mechanism 10 of the present invention further includes two first resilient members 18 connected between the two driving members 13 and the backrest 30. The two first resilient members 18 bias the two driving members 13 to slide toward the headrest 40. Specifically, in this embodiment, each of the two first resilient members 18 is preferably a tensional spring and extendedly connected between a third pivoting shaft 16 and the restraining and guiding rod 34 near the third pivoting shaft 16, such that the two first resilient members 18 are connected between the two driving members 13 and the backrest 30. That is, when the headrest 40 is adjusted to slide relative to backrest 30 upwardly, the two pushing portions 41 depart from the two pushed portions 131, and the two first resilient members 18 drive the two driving members 13 to slide toward the headrest 40 to automatically return, which is convenient in use.

Furthermore, the front end of the front raising block 11 is pivoted to the base 20 by two first pivoting shafts 14, such that the front end of the front raising block 11 is connected to the base 20, which makes structure more reasonable and compact. Preferably, the two first pivoting shafts 14 are disposed along a horizontal direction of the base 20, which makes connecting structure between the front end of the front raising block 11 and the base 20 more reasonable and compact. Preferably, the two first pivoting shafts 14 are integrally formed with the front end of the front raising block 11, and ends of the two first pivoting shafts 14 away from the front raising block 11 are pivoted to the base 20, which makes pivoting structure between the front end of the front raising block 11 and the base 20 more reasonable and compact and simplifies procedures of manufacturing and assembly. However, the pivoting structure between the front end of the front raising block 11 and the base 20 is not limited to thereto, and it depends on actual demands.

Furthermore, in this embodiment, the rear end of the rear raising block 12 is slidably and pivotally connected to the backrest 30, such that the rear end of the rear raising block 12 is connected to the backrest 30. Preferably, the rear end of the rear raising block 12 is slidably disposed on the backrest 30 along the vertical direction of the backrest 30, which makes connecting structure between the rear end of the rear raising block 12 and the backrest 30 reasonable and compact and is capable of adjusting an included angle between the rear raising block 12 and the backrest 30 easily. Specifically, the rear end of the rear raising block 12 is located between the pair of guiding tracks 35. Particularly, two sliding portions 121 are disposed on the rear end of the rear raising block 12 and slidably disposed between the pair of guiding tracks 35 located at a left side and a right side of the backrest 30, such that the rear end of the rear raising block 12 is slidably and partially detachably connected to the backrest 30 by the two sliding portions 121. Particularly, the two sliding portions 121 are formed by two protruding blocks extending from a left side and a right side of the rear end of the rear raising block 12 toward the backrest 30 and stretching between the pair of guiding tracks 35 located at the left side and the right side of the backrest 30, which prevents a displacement of the rear raising block 12 along the horizontal direction and makes sliding movement of the sliding portion 121 smoother and more reliable.

Furthermore, the rear end of the front raising block 11 and the front end of the rear raising block 12 are pivoted to each other by two second pivoting shafts 15, such that the rear end of the front raising block 11 is connected to the front end of the rear raising block 12. Preferably, the two second pivoting shafts 15 are disposed along the horizontal direction of the base 20 and parallel to the two first pivoting shafts 14. Specifically, two first pivoting sockets 111 are formed on the rear end of the front raising block 11 for allowing the two second pivoting shafts 15 to pivot. Two second pivoting sockets 122 are formed on the front end of the rear raising block 12 for allowing the two second pivoting shafts 15 to pivot, which makes structure more reasonable and rotation smoother.

Furthermore, the raising block 10 further includes two linking members 17. Specifically, ends of the two linking members 17 are pivoted to the two second pivoting shafts 15. The other ends of the two linking members 17 are pivoted to the two driving members 13. The two driving members 13 raise the front raising block 11 and the rear raising block 12 by the two linking members 17, which makes structure more reasonable and compact. Particularly, two third pivoting sockets 171 are formed on the ends of the two linking members 17 near the two second pivoting shafts 15 for allowing the two second pivoting shafts 15 to pivot. Two fourth pivoting sockets 172 are formed on the other ends of the two linking members 17 away from the two second pivoting shafts 15. Two fifth pivoting sockets 133 are formed on ends of the two driving members 13 near the two linking members 17. The two fourth pivoting sockets 172 and the two fifth pivoting sockets 133 are pivoted to each other by the two third pivoting shafts 16, which makes structure more reasonable and compact.

Preferably, the raising mechanism 10 of the present invention further includes two second resilient members 19 connected between the two linking member 17 and the two driving members 13. The two second resilient members 19 bias the two linking members 17 to drive the two second pivoting shafts 15 to move toward the base 20. Specifically, in this embodiment, the two second resilient members 19 can be preferably torsional springs, and middle portions of the two second resilient members 19 sheathe on the two third pivoting shafts 16. Ends of the two second resilient members 19 abut against walls of the two linking members 17. The other ends of the two second resilient members 19 abut against walls of the two driving members 13. Since the two second resilient members 19 are connected between the two linking members 17 and the two driving member 13 and bias the two linking members 17 to drive the two second pivoting shafts 15 to move toward the base 20, it is easy to return the front raising block 11, which make operation more convenient.

Operational principle and process of the raising mechanism 10 of the present invention are described hereinafter. As shown in FIG. 3 and FIG. 4, the headrest 40 is positioned at the highest position of the headrest 40 relative to the backrest 30. At the same time, the front raising block 11 and the rear raising block 12 are located at the lowest positions relative to the base 20, i.e., a child sitting on the seating portion 50 is at the lowest position relative to the base 20. When the child safety seat 100 is adapted for a younger or a shorter child, it is required to adjust the headrest 40 to the lowest position relative to the backrest 30 and raise the younger or shorter child who sits on the seating portion 50. The two engaging members 42 are to be operated to disengage from the two highest engaging portions 32 for allowing the headrest 40 to slide relative to the backrest 30 downwardly. When the headrest 40 moves to the lowest position relative to the backrest 30, the two pushing portions 41 on the lower ends of the headrest 40 push the two pushed portions 131 on the upper ends of the two driving members 13, such that the two driving members 13 overcomes first resilient forces generated by the two first resilient members 18 to move relative to the backrest 30 downwardly. The two linking members 17 are pushed by the two driving members 13, such that the two linking members 17 overcome second resilient forces generated by the two second resilient members 19 to pivot for compressing the two second resilient members 19. The two second pivoting shafts 15 move away from the base 20 for increasing an included angle between the front raising block 11 and the base 20 and the included angle between the rear raising block 12 and the backrest 30, which raises the front raising block 11 and the rear raising block 12. Afterward, the two engaging members 42 are to be operated to engage with the lowest two engaging portions 32 for locking the headrest 40 relative the backrest 30. The two pushing portions 41 push the two pushed portions 131 for restraining the two driving members 13 to slide relative to the backrest 30 upwardly, such that heights of the two second pivoting shafts 15 supported by the two linking members 17 and heights of the front raising block 11 and the rear raising block 12 are maintained, which achieves operation of raising a sitting height of the younger child who sits on the seating portion 50. As shown in FIG. 5 to FIG. 7, when the headrest 40 is adjusted to the lowest position relative to the backrest 30, the front raising block 11 and the rear raising block 12 are adjusted to the highest position relative to the base 20 simultaneously for raising a child who sits on the seating portion 50.

As shown in FIG. 5 to FIG. 7, when the child safety seat 100 is adapted for an elder or taller child, the two engaging members 42 are to be operated to disengage from the two corresponding engaging portions 32 for allowing the headrest 40 to slide relative to the backrest 30 upwardly. The two pushing portions 41 on the lower end of the headrest 40 slides upwardly simultaneously. The two driving members 13 are driven to slide relative to the backrest 30 upwardly by the first resilient forces generated by the two first resilient members 18, such that the two pushed portions 131 and the two pushing portions 41 disengage from each other when the rear raising block 12 returns. At the same time, the two second resilient members 19 drive the two linking members 17 to pivot reversely for driving the two second pivoting shafts 15 to move toward the base 20, which reduces the included angle between the front raising block 11 and the base 20 and the included angle between the rear raising block 12 and the backrest 30 and lowers the front raising block 11 and the rear raising block 12. When the headrest 40 is adjusted to a desired position, the front raising block 11 and the rear raising block 12 return to the lowest positions relative to the base 20. Afterward, the two engaging members 42 are to be operated to engage with another two engaging portions 32 for locking the position of the headrest 40 relative to the backrest 30. Furthermore, since the two restraining and guiding rods 34 abut against walls of the restraining and guiding slot 132, the two driving members 13 cannot continue sliding relative to the backrest 30 upwardly, which limits sliding displacements of the two driving members 13. Therefore, even if the two pushing portions 41 disengage from the two pushed portions 131, the two driving members 13 still can be restrained from sliding upwardly, such that the heights of the two second pivoting shafts 15 supported by the two linking members 17 are maintained for keeping the front raising block 11 and the rear raising block 12 at the lowest positions relative to the base 20. As shown in FIG. 3 and FIG. 4, when the headrest 40 is adjusted to a desired position except the lowest position relative to the backrest 30, the front raising block 11 and the rear raising block 12 are located at the lowest positions relative to the base 20, i.e., a child sits on the seating portion 50 at the lowest position as shown in FIG. 3.

In contrast to the prior art, the raising mechanism of the present invention utilizes the driving member for raising the front raising block and the rear raising block, so as to raise a child sitting on the seating portion to a desired position according to a height of the child, which improves comfort and safety of the children. Furthermore, the raising mechanism and the child safety seat of the present invention have advantages of simple structure, low manufacturing cost, and easy operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A raising mechanism adapted for a child safety seat, the child safety seat comprising a base and a backrest disposed on the base, the child safety seat further comprising a headrest slidably disposed on the backrest along a vertical direction of the backrest, and the raising mechanism comprising:
   a front raising block, a front end of the front raising block being connected to the base;
   a rear raising block connected to the front raising block, the front raising block and the rear raising block forming a seating portion cooperatively; and
   a driving member slidably disposed on the backrest along the vertical direction of the backrest, the driving member driving the front raising block and the rear raising block to raise the seating portion, and the headrest engaging the driving member to drive the front raising block and the rear raising block to raise the seating portion.

2. The raising mechanism of claim 1, wherein when the headrest is adjusted to be located at a lowest position, the headrest pushes the driving member to drive the front raising block and the rear raising block to raise the seating portion to a highest position.

3. The raising mechanism of claim 1, further comprising at least two engaging portions disposed on the backrest along the vertical direction of the backrest, and the headrest selectively engaging with one of the at least two engaging portions.

4. The raising mechanism of claim 1, further comprising a pushing portion disposed on a lower end of the headrest and a pushed portion disposed on an end of the driving member near the headrest, and the pushing portion abutting against the pushed portion.

5. The raising mechanism of claim 3, wherein a restraining and guiding slot is formed on the driving member along a longitudinal direction, the raising mechanism further comprises a restraining and guiding rod disposed on the backrest and passing through the restraining and guiding slot.

6. The raising mechanism of claim 3, further comprising a first resilient member connected between the driving member and the backrest, the first resilient member biasing the driving member to slide toward the headrest.

7. The raising mechanism of claim 1, further comprising a first pivoting shaft, the front end of the front raising block being pivoted to the base by the first pivoting shaft.

8. The raising mechanism of claim 7, wherein the first pivoting shaft is disposed along a horizontal direction of the base.

9. The raising mechanism of claim 7, further comprising a second pivoting shaft, a rear end of the front raising block being pivoted to a front end of the rear raising block by the second pivoting shaft.

10. The raising mechanism of claim 9, wherein the second pivoting shaft is disposed along a horizontal direction of the base.

11. The raising mechanism of claim 9, further comprising a linking member, an end of the linking member being pivoted to the second pivoting shaft, the other end of the linking member being pivoted to the driving member, the driving member being disposed on the backrest along the vertical direction of the backrest, and the driving member raising the front raising block and the rear raising block by the linking member.

12. The raising mechanism of claim 11, further comprising a second resilient member connected between the linking member and the driving member, the second resilient member biasing the linking member to drive the second pivoting shaft to move toward the base.

13. A child safety seat comprising:
a base;
a backrest disposed on the base;
a headrest slidably disposed on the backrest along a vertical direction of the backrest; and
a raising mechanism comprising:
a front raising block, a front end of the front raising block being connected to the base;
a rear raising block connected to the front raising block, the front raising block and the rear raising block forming a seating portion cooperatively; and
two driving members slidably disposed on the backrest along the vertical direction of the backrest, the two driving members driving the front raising block and the rear raising block to raise the seating portion, and the headrest engaging the two driving members to drive the front raising block and the rear raising block to raise the seating portion.

14. The child safety seat of claim 13, further comprising a pair of guiding tracks, the pair of guiding tracks being disposed on the backrest along the vertical direction of the backrest, a rear end of the rear raising block being located between the pair of guiding tracks.

15. The child safety seat of claim 14, wherein the two driving members are slidably disposed in the pair of guiding tracks respectively.

16. The child safety seat of claim 13, wherein when the headrest is adjusted to be located at a lowest position, the headrest pushes the driving member to drive the front raising block and the rear raising block to raise the seating portion to a highest position.

17. The child safety seat of claim 13, wherein the raising mechanism further comprises at least two engaging portions disposed on the backrest along the vertical direction of the headrest, and the headrest selectively engages with one of the at least two engaging portions.

18. The child safety seat of claim 13, wherein the raising mechanism further comprises a pushing portion disposed on a lower end of the headrest and a pushed portion disposed on an end of the driving member near the headrest, and the pushing portion abuts against the pushed portion.

* * * * *